US005760818A

United States Patent [19]

Hinton et al.

[11] Patent Number: 5,760,818

[45] Date of Patent: Jun. 2, 1998

[54] MOUNTING ARRANGEMENT FOR A RASTER OUTPUT SCANNER

[75] Inventors: John H. Hinton, Ontario; Edward C. Bock, Webster; David K. Shogren, Ontario; Daniel W. Costanza, Webster, all of N.Y.

[73] Assignee: Xerox Corporation, Stamford, Conn.

[21] Appl. No.: 354,390

[22] Filed: Dec. 12, 1994

[51] Int. Cl.[6] .......... B41J 2/435; G01D 15/74; H01S 1/131; G11B 7/00

[52] U.S. Cl. .......... 347/263; 347/257; 399/162; 399/111

[58] Field of Search .......... 347/263, 245, 347/257, 242; 399/162, 111

[56] References Cited

U.S. PATENT DOCUMENTS 4,703,334 10/1987 Mochimaru et al. .......... 347/130
5,153,644 10/1992 Yang et al. .......... 347/247
5,319,537 6/1994 Powers et al. .......... 347/116
5,333,908 8/1994 Dorney et al. .......... 283/38

*Primary Examiner*—N. Le
*Assistant Examiner*—Raquel Yvette Gordon

[57] ABSTRACT

A Raster Output Scanner (ROS) assembly is mounted within a printing machine frame so as to maintain a very precise relationship with the photoreceptor being imaged. A ROS housing is mounted in relation to the photoreceptor so that, while the housing is fixed to a machine frame by isolators to damp out vibrations and transients, a mechanical latching to a photoreceptor backer bar provides a degree of rotational movement consistent with movement of the photoreceptor. Thus, errors created by photoreceptor motion are compensated for. The invention discloses a 3 or a 4 point mounting arrangement which affords a high degree of stability coupled with conformance with exacting registration tolerances.

6 Claims, 3 Drawing Sheets

MOUNTING ARRANGEMENT FOR A RASTER OUTPUT SCANNER

BACKGROUND OF THE INVENTION

The present invention is generally directed towards an improved mounting for a ROS housing containing the optical components used to direct a modulated scanning beam onto the surface of a photoreceptor, and, more particularly, to a ROS to photoreceptor mounting means and method which minimizes imaging errors due to misalignments between the photoreceptor and the ROS.

Printing systems utilizing a ROS to form images on a photoreceptor surface are well known in the art. Conventionally, the ROS includes a diode or gas laser for generating a coherent beam of radiation; a modulator for modulating the laser output in accordance with an input video image signal; and a multifaceted polygon scanner for scanning the modulated laser beam output line by line, across the surface of a charged photoreceptor to form the latent image. Also included in the ROS are various optical components to collimate, expand, focus, and align the modulated scanning beams. These optical components are fixedly mounted within a housing frame, which is positioned within a printer machine frame, so that the modulated and shaped scanning beams emerging from a window in the housing are directed along a scan line which is perpendicular to the photoreceptor surface. The lines will be formed in parallel across the surface of the photoreceptor belt. The belt should be aligned so that these parallel lines are formed perpendicular to the direction of belt travel. Further, the aerial image formed on the photoreceptor should be in proper focus. There are several causative factors which can contribute to belt misalignment and the out of focus conditions. A first cause is the difficulty of establishing the initial ROS to photoreceptor relationship with the high degree of accuracy required to meet the tolerance specifications of black only and of color printers which register (superimpose) subsequently formed images. Another cause of misalignment is vibrations emanating from the main frame of the printing machine in which the ROS is housed.

U.S. Pat. Nos. 5,333,908 and 4,703,334 are representative of prior art techniques for mounting a ROS in a machine housing. These prior art disclosures do not describe techniques which meet the very strict imaging formation tolerances required.

It is therefore one object of the invention to mount a ROS housing within a printing machine with respect to a photoreceptor to meet strict, tight imaging tolerance standards.

It is a further object of the invention to mount the ROS housing to the printing machine frame so as to minimize the effects of machine vibration on the image being formed at the photoreceptor.

SUMMARY OF THE INVENTION

In accordance with the invention, a ROS housing is mechanically latched to the photoreceptor by fixed arms attached to an image backer bar defining the image plane area. The ROS housing is also mounted to the main machine frame with isolators, in a preferred embodiment compression springs, the combination of isolators and fixed linkages from the housing to the photoreceptor allow a latching to the photoreceptor which under all tolerance conditions will provide vibration isolation as well as a degree of rotational movement of the photoreceptor. More particularly, the invention relates to a method for mounting a Raster Output Scanner (ROS) system containing a plurality of optical components in an accurate imaging relationship with a photoreceptor including the steps of:

(a) positioning the optical components of the ROS within a housing, (b) flexibly securing the housing to a printing machine frame at least one mounting location, (c) positioning a photoreceptor adjacent to the ROS housing so that ROS output beams generated by the ROS and directed out of the ROS housing form successive, parallel scan lines along the width of said photoreceptor, said photoreceptor moving in a process direction, and (d) connecting the ROS housing with at least two fixed arms to an image backer bar operatively coupled with said photoreceptor to define an image plane area.

DESCRIPTION OF THE INVENTION

Figure 1:
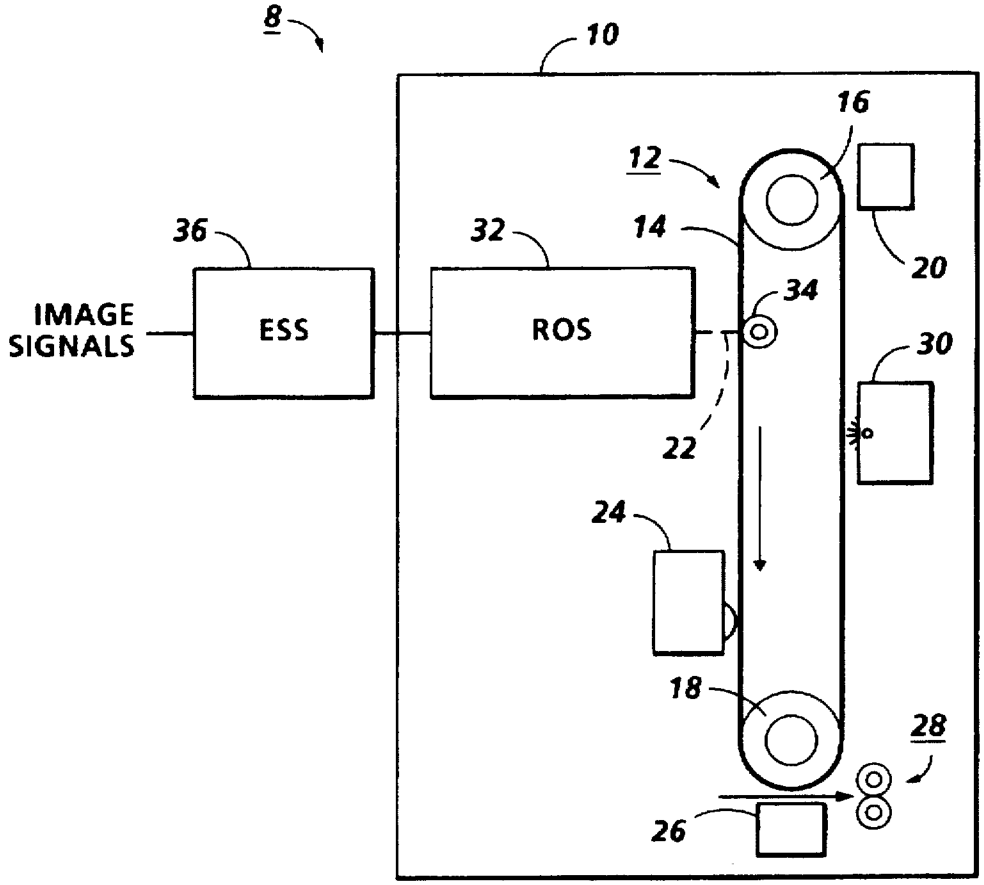
FIG. 1 shows a side schematic front view of a xerographic printing machine illustrating a ROS imaging onto a photoreceptor belt.

Referring now to FIG. 1, there is shown a xerographic printing system 8 whose components are housed within a machine frame 10. Mounted within frame 10 shown in front view, is a photoreceptor module 12 including a belt 14 driven around rollers 16,18. Arranged around the photoreceptor, in conventional fashion, are a charging station 20, an exposure station 22, a development station 24, a transfer station 26, a fusing station 28 and a cleaning station 30. The operation of these stations is conventional and known in the art as disclosed for example, in U.S. Pat. No. 5,153,644 whose contents are hereby incorporated by reference. System 8, in a first embodiment, is a single pass, black only printer. It will be further understood that highlight color or full color images could also be formed by system 8 by forming color images at station 22, with multiple passes of the belt and superimposition of successive color images in registration with previously formed images. Developer station 24 would then be modified to include additional color developer housings as is understood in the art.

At the exposure station 22, beams generated by ROS unit 32 are scanned across the surface of belt 14 along an image exposure zone, defined by a backer bar 34 which is in contact with and extends along the width of, the belt (into the page). ROS unit 32 generates modulated output beams in response to input video image signals processed by ESS 36, and directs the beam through an aperture in a housing across the image width area of the photoreceptor.

Figure 2:
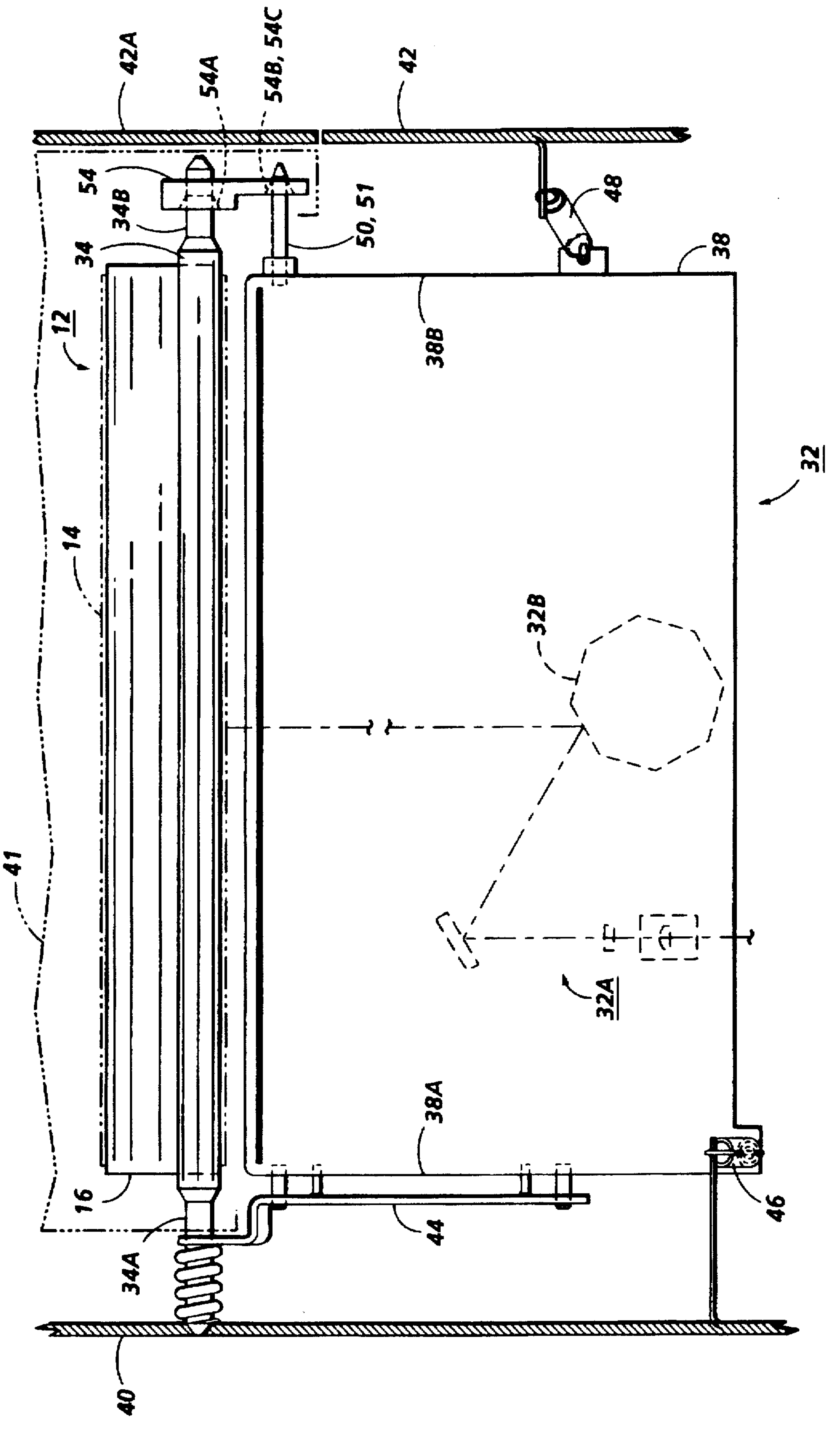
FIG. 2 shows a partial top view illustrating mounting details of the ROS unit to the machine frame and the photoreceptor module.
Figure 3:
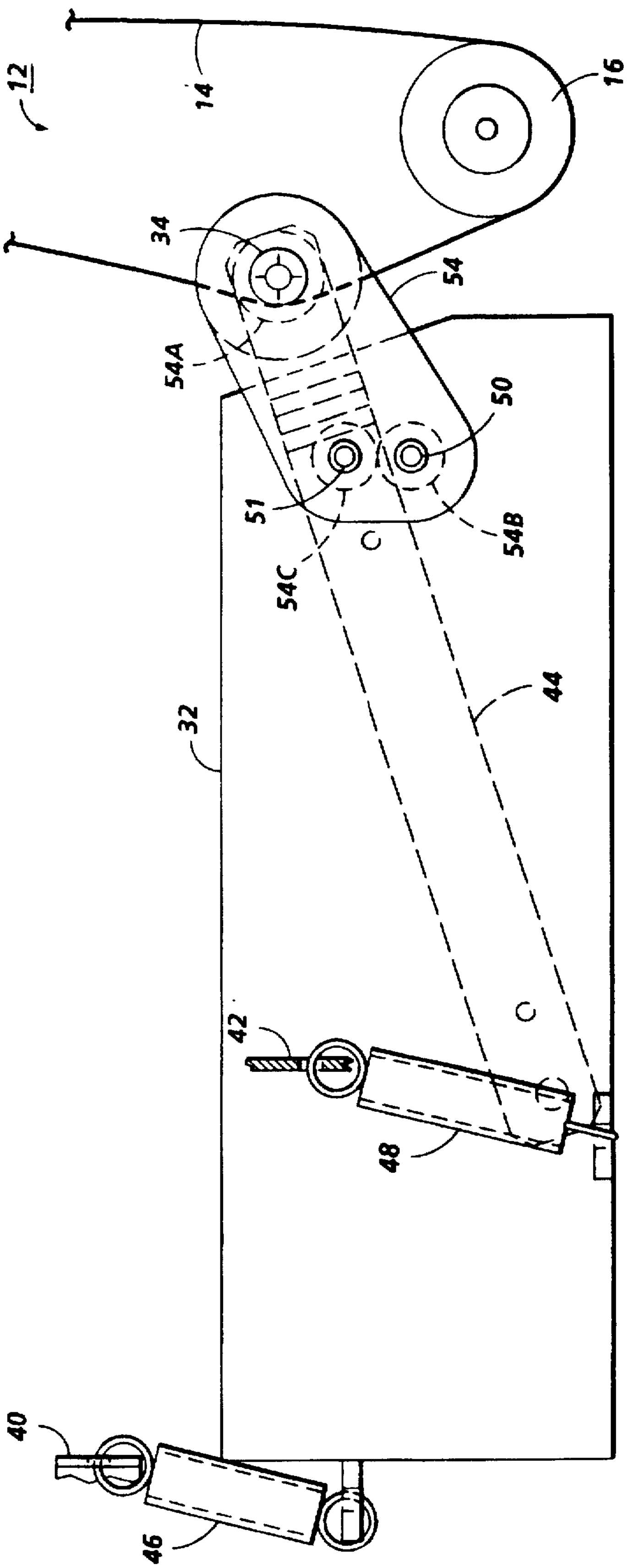
FIG. 3 shows details of the ROS to photoreceptor mounting from the front of the machine.

ROS 32 includes optical components which are mounted within ROS housing 38 shown in FIGS. 2 and 3. ROS 32 is conventional in the art and comprises within housing 38, a laser for generating a collimated output beam of radiation, the radiation modulated in accordance with the image signals transmitted through ESS 36. FIG. 2 shows in dotted form a prepolygon beam forming optics 32A, and a rotatable polygon 32B for sweeping modulated beams across the surface of photoreceptor belt 14, the scanning beams exiting housing 38 through an exit window. Conventional postpolygon beam shaping components (not shown) are also positioned within the housing 38. The modulated scanning beams form a latent image on the previously charged surface of belt 14, the latent image being subsequently developed at development station 24 with toner of appropriate polarity. The developed image is then transferred to a copy sheet at station 26 and fused at fusing station 28, which may be conventional heat and pressure roll arrangement, to create a final image.

The invention is directed to the positional relationship between ROS housing 38 and belt 14. These two components must be mounted with respect to each other in such a way that the modulated image lines being scanned across the surface of belt 14 are in proper focus and that successive lines are exactly spaced in the process direction (direction of belt travel).

Conventional designs rely on each component (ROS housing 38 and photoreceptor 14) to be attached to the machine frame at defined mount locations. Because of machine transients and vibrations, this design may not meet strict tolerance registration requirements for some systems. According to the invention, and as shown in FIGS. 2 and 3, ROS housing 38 is attached to the image backer bar 34 by a fixed arms 44 and 54. The housing is also attached to the machine frame by two isolator mounts 46 and 48. The isolator mounts provide the main support for the ROS housing while isolating the housing (and the optical components mounted within) from machine transients and vibrations. The arms, as will be seen, prevent lateral translation of the housing relative to the photoreceptor while allowing some rotational degree of movement (approximately 5°–6°). The net effect is to eliminate relative motion of the aerial image formed by the ROS and the photoreceptor.

Continuing with a more detailed description, belt 14 is positioned between walls 40 and 42 and form part of a module 12 which can be withdrawn from the front of the housing through drawer 42A (out of the page in FIG. 3).

Associated with belt 14 is image backer bar 34, one end 34A mounted in wall 40, as shown in FIG. 2. Bar 34 is mounted to be in contact with a portion of belt 14 and defines the scanning (imaging) area. Mechanically latched to bar 34 is pivot arm 44 whose other end is rigidly connected to ROS housing wall 38A. Arm 44 is part of a 4 point housing connection, the other three points being defined by isolators 46, 48 attached between ROS housing 38 and machine walls 40,42, respectively, and a second arm 54. Arm 54 also forms part of module 41. As the module is installed into operative position one, one end of bar 54 has an aperture 54A which is fitted to the end portion 34B of backer bar 34. The other end of arm 54 has tapered apertures 54B, 54C which engage two pins 50, 51, respectively, located on housing wall 38B. Thus, when module 12 is pulled from the drawer the backer bar 34 remains in position; when the module is replaced arm 54 becomes mechanically latched to bar 34 and to pins 50, 51 providing the second, rigid, and the fourth, mounting, point.

In a preferred embodiment isolators 46,48 are compression springs whose location is chosen to be in alignment with the center of gravity of the housing thereby providing optimization of the load, e.g., the isolators support most of the load of the housing. This 4 point mounting provides a ROS-to-belt spacing with a high degree of required tolerance. In a preferred embodiment, the point mounting is a combination of 2 flexible mounting points (springs 46,48) and at least two mounting arms (44, 54) which provides for a limited rotational movement of the housing about the backer bar 34. This unique combination allows the ROS housing a degree of movement (rotational) about bar 34 enabling it to latch with the photoreceptor under all tolerance conditions as well as providing excellent isolation from machine frame vibration by each of the springs.

It will be appreciated that the location of ROS housing 32 may be varied depending upon system needs. The location of isolators 46,48 may be varied to maintain the required forces to isolate the machine vibration. For certain systems, a single isolator (providing a 3 point mount) may be sufficient to satisfy registration tolerances. For this 3 point mount, the isolator location will be chosen with respect to the center of gravity of the housing to substantially support the housing weight.

While the embodiment disclosed herein is preferred, it will be appreciated from this teaching that various alternative, modifications, variations or improvements therein may be made by those skilled in the art. For example, although the embodiments shown in FIGS. 1 through 3 contemplate a single ROS system 32 which forms black and white images in a single pass or color images in a multiple registration pass, the invention can also be practiced in a single pass printer system wherein a plurality of ROS units 32 and a plurality of exposure stations 22 are located along the path of travel of belt 14 and wherein a charge and development station is associated with each imager station. Such a system is disclosed, for example, in U.S. Pat. No. 5,319,537 whose contents are hereby incorporated by reference. All of the above variations and embodiments are intended to be encompassed by the following claims:

We claim:

1. A method for mounting a Raster Output Scanner (ROS) system containing a plurality of optical components in an accurate imaging relationship with a photoreceptor having a width, said method including the steps of:

(a)positioning the optical components of the ROS within a housing, (b)flexibly securing the housing to a printing machine frame, (c)positioning a photoreceptor adjacent to the ROS housing so that ROS output beams generated by the ROS and directed out of the ROS housing form in successive, parallel scan lines along the width of said photoreceptor, said photoreceptor moving in a process direction, and (d)connecting the ROS housing with at least two arms attached to an image backer bar operatively coupled with said photoreceptor to define an image plane area.

2. The method of claim 1 wherein the housing is flexibly secured to the machine at two mounting locations and the ROS housing is connected to the backer bar by two arms thereby forming a 4 point ROS housing-to-photoreceptor mount.

3. The method of claim 1 wherein the housing is flexibly secured to the machine at one mounting location and the ROS housing is connected to the backer bar by two arms thereby forming 3 point housing to photoreceptor mount.

4. An improved xerographic printing machine which includes a machine frame, a photoreceptor belt moving in a process direction and passing through an exposure station wherein modulated scanning beams are directed to the photoreceptor belt surface, said printing machine further including a charging station to charge the surface of the belt, a developer station to develop a latent image on the belt surface formed by said scanning beams, a transfer station to transfer a developed image to a copy sheet and a fusing station to fuse the transferred image on said copy sheet and wherein the imager comprises at least one Raster Output Scanner (ROS) which generates said modulated scanning beams, said ROS comprising a plurality of optical components housed within a ROS housing, the improvement comprising, in combination, an image bar mounted to the machine frame and in contact with said photoreceptor belt so as to define a scanning area, two mechanically latched arms connecting the ROS housing to the image bar, the arms rotatable about an axis of said image bar and at least one isolator member flexibly mounted to the ROS housing and the machine frame to provide support for said housing.

5. The machine of claim 4 wherein the housing is flexibly secure to the machine at two mounting locations and the ROS housing is connected to the backer bar by two arms thereby forming a 4 point ROS housing to photoreceptor mount.

6. The machine of claim 4 wherein a single isolator is connected between the housing and the machine frame to form a 3 point ROS to photoreceptor mount, the isolator mounted with relation to the center of gravity of the housing.

* * * * *